United States Patent [19]

Thoma

[11] 4,240,148
[45] Dec. 16, 1980

[54] CENTRALLY CONTROLLED CONVEYOR SYSTEM

[75] Inventor: Ferdinand Thoma, Berlin, Fed. Rep. of Germany

[73] Assignee: Siemens Aktiengesellschaft, Berlin & Munich, Fed. Rep. of Germany

[21] Appl. No.: 949,874

[22] Filed: Oct. 10, 1978

[30] Foreign Application Priority Data

Oct. 27, 1977 [DE] Fed. Rep. of Germany ....... 2748448

[51] Int. Cl.³ .................... G06F 15/20; B65G 43/00
[52] U.S. Cl. .................................. 364/478; 364/900; 198/349
[58] Field of Search .............. 364/478, 900; 198/349; 209/564, 922; 340/674

[56] References Cited

U.S. PATENT DOCUMENTS

| | | | |
|---|---|---|---|
| 3,639,728 | 2/1972 | Helfand et al. | 364/478 |
| 3,725,867 | 4/1973 | Jordan | 364/900 |
| 3,803,556 | 4/1974 | Duffy | 364/900 |
| 3,803,561 | 4/1974 | Yucius | 364/900 |
| 3,868,643 | 2/1975 | Bullivant | 364/900 |
| 3,895,716 | 7/1975 | Ugo | 364/900 X |
| 4,027,246 | 5/1977 | Caccoma et al. | 364/478 X |
| 4,121,818 | 10/1978 | Riley et al. | 364/478 X |

Primary Examiner—Edward J. Wise
Attorney, Agent, or Firm—Hill, Van Santen, Steadman, Chiara & Simpson

[57] ABSTRACT

Station-individual control sets of dispatching and receiver stations are connected to a multiconductor address line which is connected to a central program control device. All control sets are connected via an operation decoder to a multiconductor control line connecting to the program control device. After the output to the control line of operation information from the program control device which introduces a destination information transfer, the operation decoder of the marked dispatching station responds and applies signal voltage to a destination selection device connected to the address line in parallel with an address decoder.

11 Claims, 4 Drawing Figures

CENTRALLY CONTROLLED CONVEYOR SYSTEM

BACKGROUND OF THE INVENTION

Field of the Invention

The invention relates to a conveyer system with dispatching and receiver stations exhibiting station-individual control sets which are coupled to the actuation and signal devices of the system, said control sets being connected in parallel to a multiwire address line connecting to a central program control device, whereby the dispatching stations respectively each exhibit a destination selection device, and dispatching stations ready for dispatching operation are marked by cyclically applying station-individual address information to the address line by means of the program control device, and giving-off an acknowledgement signal for the program control device to an acknowledgement line jointly assigned to all stations by means of an address decoder responding to the applied address information when coincidence is present.

The address of the marked dispatching station remains on the address line in this conveyer system after the acknowledgement signal is output to the program control device, whereby the dispatching station is activated to additional control processes which are initiated and carried out by the control set of this station. The extent of the logic linkage of the control components of the control sets can be relatively extensive depending upon the type of stations utilized and the size of the system.

The destination information is transmitted to the intended receiver station by the dispatching station occupied on the multiwire address line by means of maintaining the address information. The dispatching information is produced by a destination selection device which is generally realized in the form of keys wired in an arbitrary code. The output of the destination information predetermined by the keying system proceeds via a multiwire destination transmission line to which all stations are connected in parallel. The receiver station responding via this line, transmits a reply via an additional acknowledgement line to which all control sets of the stations are also connected in parallel; said reply can only be received by that station which is activated by the maintenance of the address information on the address line. Subsequently, that station introduces the dispatching of the conveyer receptacle to the selected receiver station.

Such a control can only be employed in such conveyer systems in which a single transport path extends past all stations as in a series system. Examples for such conveyer systems are smaller pneumatic conveyer systems and belt conveyer systems. If a conveyer system exhibits branchings, i.e. shunt systems, permitting several transport directions at particular locations, the known control can no longer be employed as all control processes are carried out by the dispatching station and the receiver station alone. Taking such different transport possibilities for conveyer receptacles into account would only be possible with a considerable expansion of the control-technical logic within the control sets of the individual stations, whereby respectively different control concepts within the control sets; and different electrical conductor line paths for connecting return, storage and holding devices for different systems would have to be provided. However, the electrical conductor line expense for employing the known control in a continuous series system must be considered very high.

SUMMARY OF THE INVENTION

The invention's underlying objective is to provide a control with a line (e.g. electrical conductor line) expense as low as possible, which respectively facilitates the same design of the control sets of the stations at least in principle for conveyer systems with arbitrary design of dispatching and receiver stations and also with an arbitrary course of transport paths between the stations, and provides a line path and connection of the control sets to the lines as independent from such alterations of the stations or the system structures in particular, as possible. This objective in combination with the initially defined conveyer system is resolved in that all control sets are provided with an operation decoder which can be switched ready for reception by means of a response signal of the assigned address decoder the operation decoder being connected to a multiwire control line which is connected to the program control device, that after the output of operation information from the program control device to the control line which introduces a destination information transmission, the operation decoder of the marked dispatch station responds and connects operating voltage to the destination selection device, which is connected to the address line in parallel with the address decoder, and that the program control device marks the receiver station with the aid of address information corresponding with the destination information and outputs operation information to the dipatching station and to the receiver station which introduces, monitors and concludes the conveyer process.

Accordingly, in the inventive conveyer system all control sets are connected to the address line and to the control line in parallel with the same value, whereby all control sets in principle are permanently in receiver status and the actuation of all control sets proceeds with the aid of the address information. As an essential point is also to be considered that respectively only one single control set is activated via the address line or via the control line at a specific time, and that the activation proceeds in each case by means of the central program control device, whereas a transmission of address information, destination information, operation information or acknowledgement signals between individual control sets is impossible.

The control structure provided in the inventive conveyer system is particularly then to be considered advantageous when drive, return or blocking devices are provided in addition to the dispatching and receiver stations. Blowers and values of a pneumatic conveyer system are to be understood as such drive devices which need not necessarily be situated in the course of the conveyer path defined by a dispatching and receiver station. An example for a return device is a shunt connecting a continuous belt path with a branching-off belt path in a belt conveyer system. Stores, for example, can be considered blocking devices which are provided with a circulating lift at the location of the junction of a belt path, into which respectively only one conveyer receptacle can be introduced per circulating segment. An advantageous further development of the invention in this conjunction provides that such drive, return and blocking devices are connected in parallel to the address line, the acknowledgement line and the control line, with control sets being coupled to the control and signal circuits for such devices.

The program control device includes these control sets in the control program in the same manner as the control sets of the dispatching and receiver stations. Thus, the program control device marks the control sets with the aid of the corresponding address information, the control sets of a conveyer path being consecutively assigned to drive, return and blocking devices by means of a dispatching station and a receiver station and the program control device outputs operation information to the appertaining control devices. The adjustment of the control structure provided in the inventive conveyer system to different conveyer systems thus results by including all control sets of all locations of the conveyer system provided with control and/or signal devices into the data channel formed by the address line, the control line and the acknowledgment line, and undertakes the actual individualization of the control by means of adjustments within the central program control device (by means of altering the data describing the system configuration).

An advantageous further development of the invention in regard to the design of the control sets provides that operation signal stores are respectively connected to the output connections of the control set individual operation decoders, the outputs of said operation signal stores being respectively connected to one of the control and signal devices. Each output of an operation decoder is thus assigned to a specific mechanical component of the appertaining control and/or signal device, whereby for the adjustment of the different switching elements of the control and/or signal devices for different conveyer systems or control devices, signal adjustment circuits are assigned to these devices. The signal adjustment circuits can contain merely an adjustment to the voltage or output level provided for the switching elements, on one hand; however, the signal adjustment circuits can also involve input circuit levels of separate control circuits for some control or signal devices employed in conveyer systems. An example of such a control device can be seen in the switch-on and switch-off control of an electric motor, for example, which drives a rotatable shunt element of a belt conveyer path.

The standardization of set operation signal stores necessary for a trouble-free execution of subsequent conveyer processes results advantageously in that the operation decoder exhibits a reset output for the operation signal stores. At specific times—expediently then when the corresponding control set is no longer actively engaged in a continuous conveyer process—operation information is output by the central program device leading to the actuation of the reset output and thus to the resetting of the operation signal stores in the operation decoder, whereby a resetting of the corresponding mechanical components of the respective station or of the control or signal device proceeds into its output position.

In accordance with an additional embodiment of the invention, the circuit status of the control and signal devices is monitored by the program control device, and the output of additional operation information is made dependent upon the presence of the circuit status, provided therefor, of the interrogated control or signal devices. The operation decoder exhibits output connections for this purpose, which respectively convey switch signals for AND-gates after corresponding interrogation information from the program control device to the control line is output, being respectively connected to an output of a status signal store assigned to one of the control and signal devices with its other input, respectively, and form the inputs of an OR-gate connected to the acknowledgement line with the aid of its outputs.

The necessary resetting of the status signal stores can thereby also proceed by corresponding outputs of the operation decoder; an advantageous further development of the invention, however, provides that the status signal stores exhibit a reset input activated by the switching-through of the respectively subordinate AND-gate. During the interrogation of the status signal store an impulse is thereby obtained from the output signal of the subordinate AND-gate, said impulse switching the status signal store. The information of the status signal store thus is lost with the interrogation via a corresponding output of the operation decoder. The considerable advantage of this measure is the saving of operation decoder outputs, and thus also in the saving of conductors of the control line.

An additional embodiment of the invention provided that the operation decoders of all control sets are connected to a common pulse line, which conveys impulses as determined by the program control device, when a corresponding address information is present on the address line. The impulses are delayed vis-a-vis the operation information in order not to effect the actuation of the operation decoders while the operation information is in a transient status.

The invention is hereafter explained with the aid of a sample embodiment illustrated in the accompanying sheets of drawings; and other objects, features and advantages will be apparent from this detailed disclosure.

DETAILED DESCRIPTION

Figure 1:
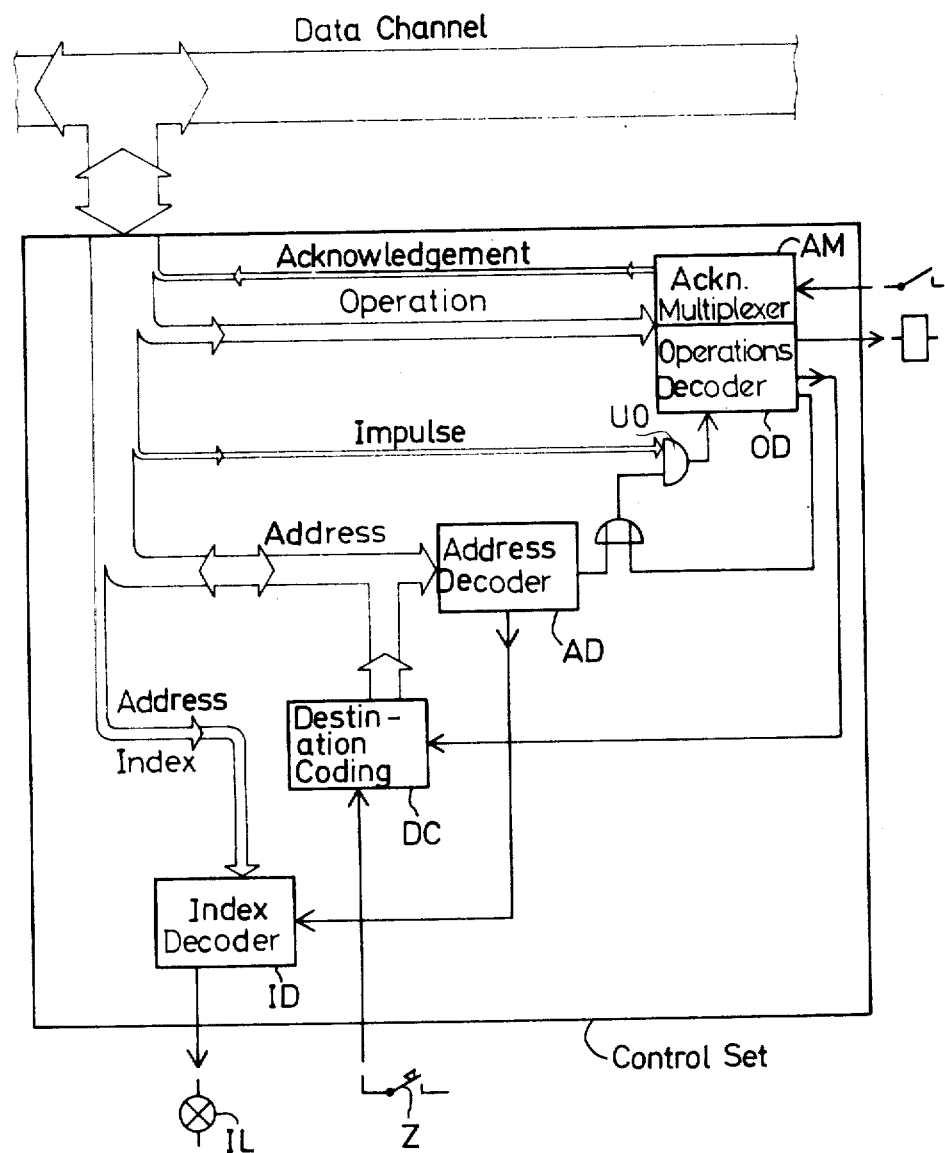
FIG. 1 therein illustrates the information flow between a control set of a combined dispatching and receiver station and the central program control device, and also illustrates the information flow within the control set.

The signal flow scheme of the control set of a combined dispatching and receiver station illustrated in FIG. 1 shows the coupling of the essential components of such a control set with one another and relative to the data channel, which represents the connection of all control sets to the central program control device.

The data channel contains address lines for influencing the address decoder AD of the control set; an actuation of the control set to receive an input from the data channel only then takes place when coincidence is present between the setting of the address decoder AD and the address information on the data channel. In case of coincidence, the address decoder AD gives off a switching signal for the operation decoder OD via an AND-gate UO which is controlled by an impulse connected to the interrogation pulse input designated "Impulse" in FIG. 1. The acknowledgment multiplexer AM gives off an acknowledgment via the acknowledgment output designated "Acknowledgment" when the control set is ready for receiving operation information. The acknowledgment multiplexer AM is controlled by acknowledgment generators which are partially designed as stores for status signals of electromechanical components of the station.

The actuation of the acknowledgment multiplexer AM results via outputs of the operation decoder OD which, for its part, is under the control influence of the operation information, supplied via an operation input designated "Operation" in FIG. 1.

When the station operates as a dispatching station, the destination coding component DC is actuated via the operation decoder, and outputs the destination information to the data channel. The destination coding is formed by means of destination keys at the station, such a key being diagrammatically indicated at Z.

The index decoder ID can be actuated for an incoming message via the address index input and an output of the address decoder AD. A signal which indicates a specific recipient of several assigned to the same station is selected by the address index input. This indication generally proceeds optically, an indicator lamp being indicated at IL.

The execution of control processes always proceeds such that operation information is output by the microcomputer (which forms the initial point of the data channel) in correspondence with the program while maintaining the coincidence between the setting of the address decoder AD of the desired control set and the address information on the data channel, that the corresponding acknowledgment is received and subsequently the next operation information is output. Thus, the control proceeds in a continuous alternation of operation information and returning acknowledgment signals.

Figure 2:
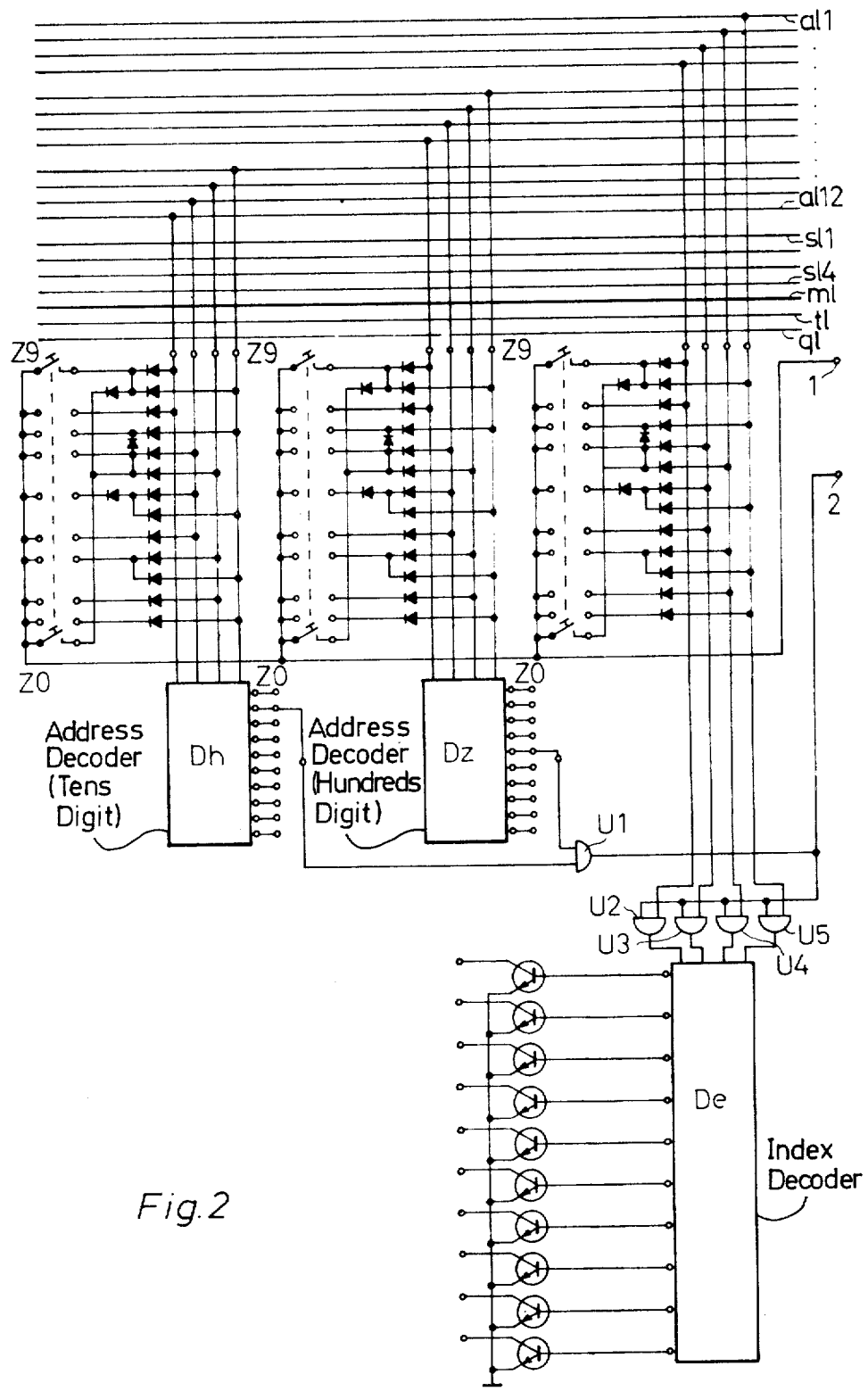
FIGS. 2, 3 and 4 together represent the control set of a combined dispatching and receiver station and the connection of the control set to the lines leading to the central program control device, not illustrated.
Figure 3:
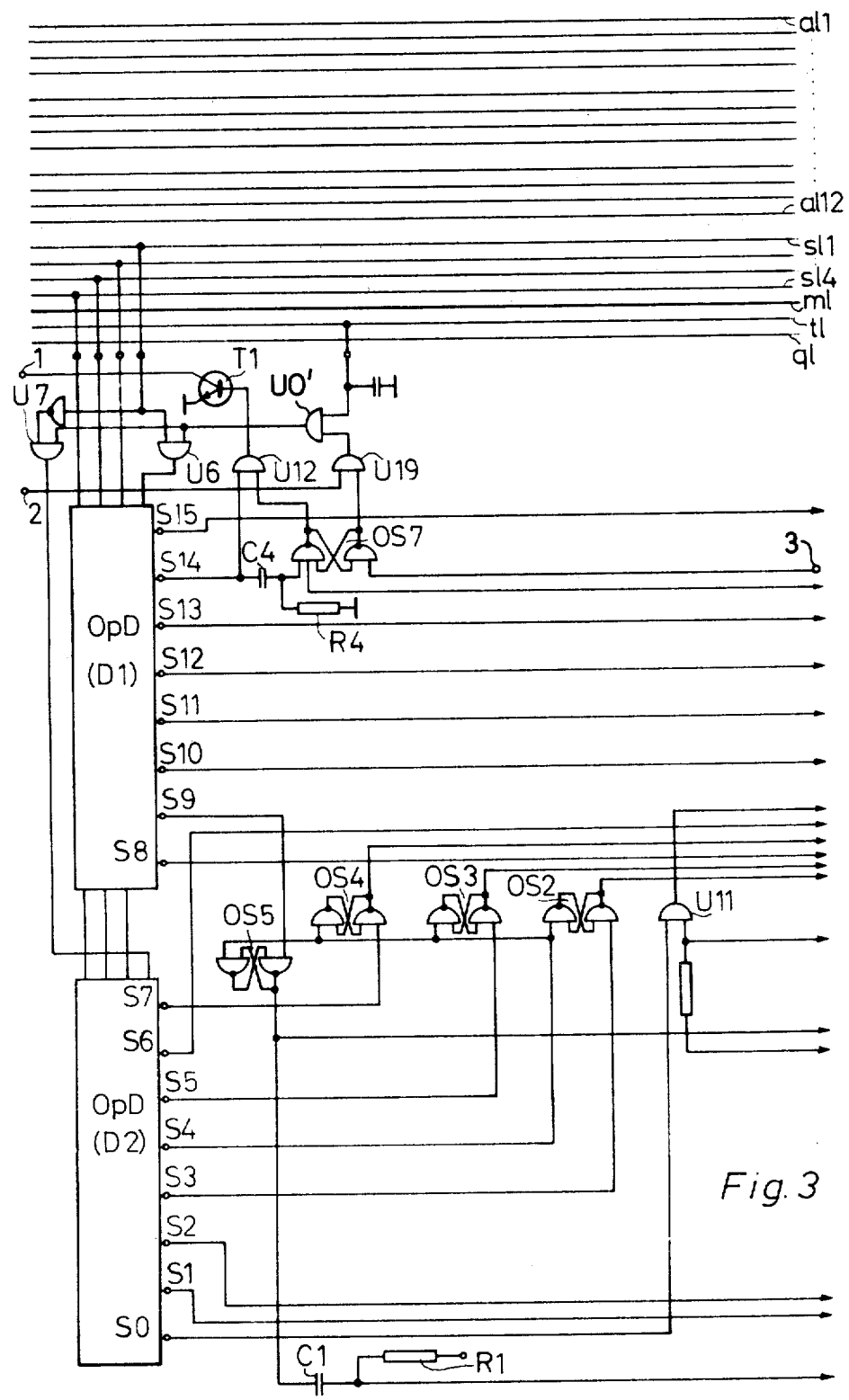
Figure 4:
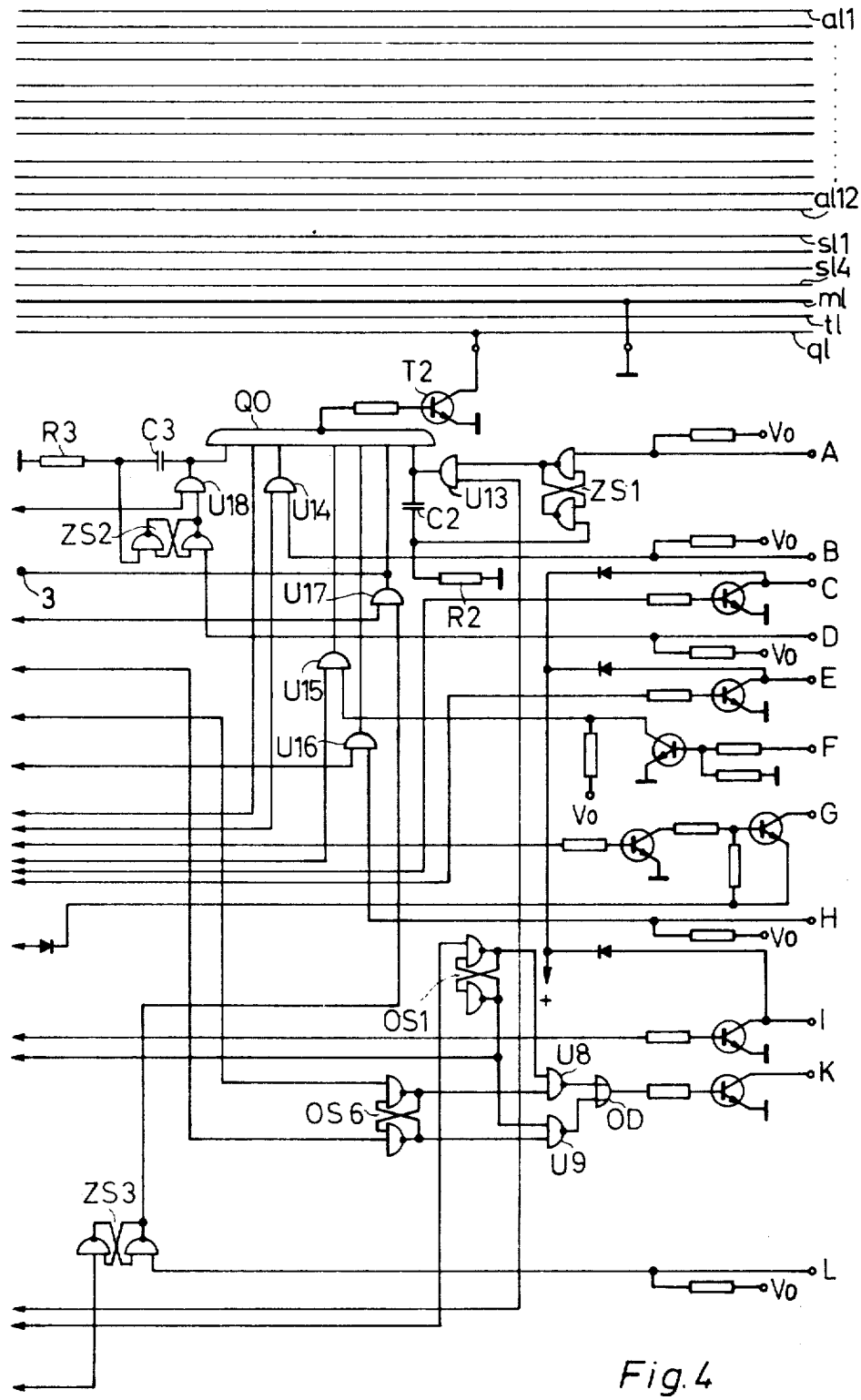

The control set illustrated in FIGS. 2 through 4 relates to a dispatching and receiver station of a pneumatic conveyer system, in which the stations are arranged at the end of the station path segments, respectively branching off from one main tube path. The following electrical and electromechanical components are connected to the signal adjustment circuits of FIG. 4 via the terminals A through L, illustrated in FIG. 4:

A: Travel contact in the range of the shunt. The travel contact is activated when a returning pneumatic conveyer carrier passes by.

B: Shunt terminal contact. The contact is activated when the conveyer shunt is switched.

C: Shunt control. The shunt control—magnet or motor—is activated when the switching signal is present at output C.

D: Travel contact at the valve. Valve and travel contact are arranged in direct proximity to the station situated at the end of a conveyer tube segment.

E: Valve. The valve is switched when a switching potential is present at output E.

F: Acknowledgment contact of the separating slide valve. The station exhibits a slide valve which can enter or exit the interior cross section of the incoming branch conveyer path. When the slide valve has reached its terminal position, the acknowledgment contact is activated.

G: Slide valve control. The drive element of the slide valve is influenced when switching potential is connected to output G.

H: Terminal contact of a dispatching store. For the present combined dispatching and receiver station, a dispatching store is assumed which selectively can enter or exit the interior of the tube segment incoming at the station. The terminal contact is activated in the entered position.

I: Dispatching store control. The dispatching store is rotated into the interior of the conveyer tube segment when a switching potential is connected to output I.

K: Display lamp. The lamp is then switched on when a pneumatic conveyer carrier destined for the station is in transit and thus no shipments can presently be dispatched.

L: Dispatching key. By activating the dispatching key connected to terminal L, a dispatch request of the station for the central program control device is interrogatably stored.

As can be concluded from FIGS. 2 through 4, the data channel, connecting the individual control sets to the central microcomputer, contains an address line comprising twelve wires al 1 through al 12, a control line formed by four wires sl 1 through sl 4 and respectively one impulse line tl, an acknowledgment line ql and a reference potential line ml. The code selected for the address transmission is a binary coded decimal code, so that each decimal digit of three decimal digits of total information can respectively be represented by four conductors of the address line al 1 through al 12. Accordingly, the control set exhibits three address decoder units Dh, Dz and De, which are respectively connected to four conductors of the address line al 1 through al 12 at the input side. The address decoder De is used for the decoding of the unit place of the address information and for the output of a signal for an incoming message. The actual address of the station is thus formed by the hundreds place and the tens place of the address information, and is processed by the address decoders Dh and Dz, whereas the additional address information is merely used for differentiating different operating personnel assigned to the same station.

The generation of the destination coding is carried out at the connection lines of the address decoders Dh, Dz and De with the aid of respectively sixteen diodes. Said diodes—in cooperation with ten destination keys Z0 through Z9 provided for each decade—provide for the output of decadically designed destination information in the same binary coded decimal code as the code of the incoming address information.

The signal voltage for outputing the destination information to the address line al 1 through al 12 is not continuously connected to the destination keys Z0 through Z9; rather, said voltage is connected at specific—subsequently to be defined—times via a conductor "1", FIGS. 2 and 3.

When coincidence of the setting of address decoders Dh, Dz with the address information on the address line is present, the AND-gate U1 is connected through, and thus a preparation signal (on conductor "2") is output to the operation decoder OpD, FIG. 3. The inputs of the address or index decoder De are simultaneously prepared via the AND-gates U2 through U5, and thus the later output of defined signals for differentiating from one another several recipients which are assigned to the station.

The operation decoder OpD (FIG. 3) is formed by two decoder levels D1, D2 and is connected to the four conductors sl 1 through sl 4 of the control line and exhibits signal outputs S0 through S15 corresponding to the sixteen different inputs which can be implemented in binary code on the four conductors sl 1 through sl 4. With the aid of AND-gates U6 and U7, the result is obtained that the decoding of the operation information is suppressed when the appertaining output signal (on line "2") of the address decoder Dh, Dz is missing. A total of seven operation signal stores OS1 through OS7 (FIGS. 3 and 4) and three status signal stores ZS1, ZS2, ZS3 (FIG. 4) are connected to the signal outputs S0 through S15, which are essentially connected to the mechanical or electromechanical components of the station connected to the terminals A through L (FIG. 4). The status signal stores ZS1, ZS2, ZS3 are connected to the multiple input OR-gate Q0, FIG. 4, (corresponding to the acknowledgment multiplexer AM, FIG. 1), which is connected to the acknowledgment line q1 via the switching transistor T2 at the output side.

In the following, the actuation of the operation signal stores OS1 through OS7 and of the status signal stores ZS1 through ZS3 and also the appertaining control processes for introducing the acknowledgment output via the OR-gate Q0 and for resetting the operation signal stores OS1 through OS7 and the status signal stores ZS1, ZS2, ZS3 are to be explained with the air of a schematic enumeration of the possible control and acknowledgment operations. The explanation respectively proceeds with the assumption of specific operation information on the control line sl 1 through sl 4 which respectively leads to the activation of a specific one of the outputs S0 through S15 of the operation decoder OpD. For the specific circuit shown, the active output of OpD is switched to a logical zero level.

Operations

Signal at the output S1:

The operation signal store OS1 (FIG. 4) is "set" by this logical zero signal, and thus the station lamp (not illustrated) is switched on via the output terminal K (FIG. 4). In addition to this optical display, the control set—as the most important consequence—is blocked for each additional activity in the system, for example, after recognizing a malfunction in the station. The blocking proceeds by the connection of the storage (reset) output of the operation signal store OS1 to the preparation input of the AND-gate U11 (compare signal at the output S0 when acknowledged). The blocking status of the control set can only be lifted by separate measures—not illustrated—of an operator.

Signal at the output S3:

The output signal sets the operation signal store OS2 (FIG. 3) which is connected to the output E (FIG. 4); the station valve is thereby opened.

Signal at the output S4:

When activated, the signal output S4 conveys the reset signal for the operation signal stores OS2, OS3, OS4 and OS5.

Signal at the output S5:

The operation signal store OS3 is set with this operation signal, and thus switch potential is provided to the output terminal C (FIG. 4) to which the shunt control is connected. Subsequently the shunt shifts into the branching position.

Signal at the output S7:

The switching signal from output S7 sets the operation signals store OS4, which thereby connects switch potential to the output terminal G (FIG. 4) and introduces the opening of the separating slide valve of the station.

Signal at the output S9:

The operation signal store OS5 is set, and thus switching potential is transmitted to the output terminal I (FIG. 4) whereby the drive element of the transmitter store pivots it into alignment with the conveyer tube section incoming to the station.

By controlling the operation signal store OS5 by means of the switching signal at output S4, a reset signal for the status signal store ZS3 is derived from the alteration of the output signal of the operation signal store OS5 via the network R1/C1 (compare signal at the output S13 in acknowledgments).

Signal at the output S11:

The operation signal store OS6 (FIG. 4) is set by this switching signal, and thus a station lamp is switched on via output terminal K (FIG. 4); said lamp indicates the present inclusion of the station into a continuous conveyer process. If the operation signal store OS1 is set, however, (compare switching signal at output S1), the lamp illuminated up to now, expires.

Signal at the output S12:

The operation signal store OS6 is reset by this switching signal, and thus the lamp switched on at output terminal K (FIG. 4) is switched off. If at this point of time the operation signal store OS1 is set, the lamp switched off up to now, lights up.

In order to indicate an operation malfunction within an individual set up (flash signal by alternately setting operation signal stores OS6 and OS1) even in blocked stations, by means of the station lamp connected to output terminal K, an exclusive OR circuit (exclusive OR: U8, U9, OD) is interposed between the outputs of stores OS1 and OS6 and the driving stage for output terminal K.

Signal at the output S14:

This switching signal is used for the transfer of destination information, set with the destination keys Z0 through Z9, FIG. 2, to the address line al 1 through al 12. The switching signal controls through the AND-gate U12 as long as the output of the operation signal store OS7, forming the other input of the AND-gate U12, conveys switching potential; this is the case when previously a dispatch request was recognized by the station (see interrogation of the status signal store ZS3 by means of the switching signal at the output S13 under "acknowledgments." The resetting of the operation signal store OS7 proceeds by differentiation of the switching signal at output S14 via R4/C4. The AND-linkage of the output signal of the operation signal store OS7 and of the switching signal at output S14 thereby replaces the response of the operation decoder OpD via the address decoder (line "2") and the AND-gates U1 and U19. Thereby all twelve wires al 1 through al 12 of the address line are available for the transfer of the destination information, whereby switching potential is connected to the total input line ("1") of the destination keys Z0 through Z9 by means of the transistor T1 which is actuated via the AND-gate U12.

Acknowledgments

The output of corresponding operation signals is used to transmit the switching status of mechanical or electromechanical components of the station either directly or with the aid of the interrogation of the output signal of the status signal stores ZS1, ZS2, ZS3 to the central program control device. The transfer of acknowledgment signals proceeds by corresponding activation of the operation decoder OpD and evaluation of the respective switching status via the multiple OR-gate Q0, FIG. 4.

Switching signal at the output S0:

The electrical availability of the control set is interrogated with the aid of the switching signal at output S0. When the control set was previously blocked by a signal at output S1 (setting of the operation signal store OS1), no output of an acknowledgment signal results.

Switching signal at the output S2:

This switching signal is used for interrogating whether the status signal store ZS1 was set by the actuation of the travel contact connected to the terminal A (FIG. 4). The resetting of the status signal store ZS1 results at the moment of interrogation—controlled via the AND-gate U13—by means of the differentiation network R2/C2.

Switching signal at the output S6:

When an acknowledgment contact, coupled to the pivotable shunt tongue of a station shunt is activated in that the pivotable shunt tongue has reached its terminal position, the interrogation leads to the output of an acknowledgment signal to the acknowledgment line q1 via the AND-gate U14.

Switching signal at the output S8:

The interrogation takes place with this switching signal via the AND-gate U15, whether the slide valve of the station has reached the respectively requested terminal position.

Switching signal at the output S10:

The interrogation takes place with this switching signal via the AND-gate U16, to determine whether the transmitter store of the station was pivoted into alignment with the conveyer tube in order to dispatch the carrier and has thus activated the terminal contact connected to the terminal H (FIG. 4).

Switching signal at the output S13:

A dispatch request of the combined dispatching and receiver station is expressed by activating the dispatching key connected to the terminal L (FIG. 4); said dispatching key sets the status signal store ZS3. The interrogation of the dispatch request results via the AND-gate U17 with whose connecting-through the operation signal store OS7 is simultaneously "set" for the preparation of the destination information transmission (see the switching signal at S14 under "Operations").

Switching signal at the output S15:

With the aid of this switching signal one interrogates whether the status signal store ZS2 has been set by activating the travel contact connected to the terminal D (FIG. 4). The resetting of the status signal store ZS2 proceeds at the moment of interrogation by the differentiation network R3/C3 at the output of the AND-gate U18.

By way of example, the operation decoders D1 and D2 may be implemented as monolithic complementary MOS (CMOS) integrated circuits so as to produce a logical zero at the selected one of outputs S0 through S15 when the corresponding code is applied to control lines sl 1 through sl 4. The "central program control device" utilized with the specifically illustrated control set is formed by a microcomputer "Intellec 8080" of Intel Corporation. The programming of the microcomputer in order to carry out the individual control operations is possible for the average person skilled in the art with the aid of the "programming manual for the 8080 microcomputer system" by Intel Corporation. The address decoders Dh, Dz and De and also the two components D1, D2 of the operation decoder OpD are respectively formed by a conventional "BCD to Decimal Decoder." The chip MM54C42/MM74C42, for example, by National Semiconductor can be employed. The OR-gate QO, for example, can be formed by the chip MM54C30/MM74C30 (8-input NAND-gate).

Exemplary Mode of Operation to Transmit a Selected Destination Address

In order to determine whether a control set such as shown in FIGS. 2 through 4 is ready to transmit a destination address, the central control may first output the address of the control set (as determined by the output lines of Dh and Dz, FIG. 2, connected to the inputs of U1). Upon coincidence of the binary coded decimal address on al 5 through al 12 with the decimal setting of the input to U1, the output of U1 is supplied via "2" to one input of gate U19. When store OS7 is "set", the gate U19 transmits an enabling potential to gate U0'. The central control may now place the desired operation code on control lines sl 1 through sl 4 and activate line tl to enable gates U6 and U7. The information bit on line sl 1 then determines whether decoder D1 or D2, FIG. 3, is to be active.

If the control set is ready for transmission of a destination address, store ZS3, FIG. 4, will be "set," and the operation code on control lines sl 1 through sl 4 for output S13, FIG. 3, will switch output S13 to a logical zero level, and cause the return of an acknowledgment signal via AND-gate U17, FIG. 4, OR-gate QO, transistor T2, and acknowledgment line q 1. (The output of AND-gate U17 after release of output S13 is at a logical one level, so that line "3", FIGS. 3 and 4, which leads to the set input of store OS7 is at a logical one level, the set output of store OS7 exhibiting a logical one signal.)

The central control having received an acknowledgment that the control set is ready to transmit a destination address, now places the operation code on control lines sl 1 through sl 4 for selecting output S14. Output S14 is thus driven to a logical zero level, producing a pulse at the reset (pulse) input of store OS7 and resetting store OS7. With the store OS7 reset, when control lines sl 1 through sl 4 are released, output S14 returns to a logical one level, and gate U12 is actuated to turn on transistor T1 and produce the desired transmission of the setting of switches Z0 through Z9, FIG. 2, via line "1", FIGS. 2 and 3.

With the transmission of the destination information, the transmit key connected with terminal L, FIG. 4, is released, allowing resetting of the store ZS3, and providing a logical zero level at line "3", FIGS. 3 and 4. Thus, gate U19 is again enabled to allow the input of furter operation codes to the operation decoder OpD.

It will be apparent that many modifications and variations may be effected without departing from the scope of the novel teachings and concepts of the present invention.

I claim as my invention:

1. A conveyor system comprising a dispatching and receiving station having (a) a station-individual control set, control and signal devices for the station coupled with said control set, a multiconductor address line and an acknowledgement line coupled with the control set, said control set having a destination selection device, (b) address decoding means comprising an address decoder for receiving station individual address information from the address line and for comparing the same with an assigned individual address for identifying said station, said address decoding means being operable for responding to the received address information when coincidence is present with respect to said assigned individual address for enabling coupling with the acknowledgement line, (c) an operation decoder which can be switched ready for operation by means of an actuation signal from the address decoder, a multiconductor control line for coupling with the operation decoder when switched ready for operation for rendering said operation decoder effective, after receipt of operation information from the control line, to effect a destination information transfer operation, (d) a destination selection device connected to the address line in parallel with the assigned address decoder for the transmission of destination information identifying a desired receiver station to the address line, (e) said station being responsive to address information in accordance with transmitted destination information on the address line, and said operation decoder being responsive to operation information from the control line for actuating said control and signal devices in effecting conveyor processes to and from said station.

2. A conveyer system according to claim 1, including drive, return and blocking devices, in addition to the dispatching and the receiver stations present, are connected in parallel to the address line (al 1 . . . al 12), to the acknowledgment line (ql) and to the control line (sl 1 . . . sl 4).

3. A conveyer system according to claim 2, including control sets with operation decoders coupled to the drive, return and blocking devices assigned to a conveyer path determined by a dispatching station and a receiver station with the aid of the corresponding address information, and said operation decoders being responsive to information for the appertaining devices to establish a desired conveyer process.

4. A conveyer system according to claim 1, including operation signal stores (OS1 . . . OS7) respectively connected to outputs (S1, S3, S5, S7, S9, S12, S14) of the control set-individual operation decoders (OpD), said operation signal stores having outputs for connection to respective ones of the control and signal devices.

5. A conveyer system according to claim 4, wherein said operation decoder (OpD) exhibits a reset output (S4) for several operation signal stores (OS2, OS3, OS4, OS5).

6. A conveyer system according to claim 4, including signal adjustment circuits connected to certain outputs (S1, S3, S5, S7, S9, S11) of the operation decoders for supplying actuating signals to the control and signal devices.

7. A conveyer system according to claim 4, wherein control circuits are assigned to individual control devices, said control circuits being responsive to the outputs of the assigned signal stores to actuate the respective individual control devices.

8. A conveyer system according to claim 1, wherein said operation decoder (OpD) has AND-gates (U13, U17, U18) associated herewith and exhibits outputs (S2, S13, S15), for conveying switching signals to the AND-gates (U13, U17, U18) in response to a respective corresponding interrogation codes supplied by the program control device to the control line (sl 1 . . . sl 4), said AND-gates being connected at their respectively other input to an output of a status signal store (ZS1, ZS3, ZS2) which is assigned to one of the control and signal devices, and an OR-gate (QO) connected to the acknowledgment lines (ql), and having respective inputs connected to the respective outputs of said AND-gates.

9. A conveyer system according to claim 8, wherein said status signal stores (ZS1, ZS2, ZS3) exhibit a reset input automatically activated when connecting through the respectively subordinate AND-gate (U13, U17, U18).

10. A conveyer system according to claim 1, wherein the operation decoders (OpD) of all control sets are connected to a common pulse line (tl), which conveys pulses that switch the operation decoders (OpD) ready for reception when corresponding address information is present on the address line (al 1 through al 12).

11. For use in combination with a conveyor system, a dispatching and receiving station adapted for connection to a plurality of other dispatching and receiver sets over a plurality of communication lines, including a set of address lines, a set of control lines, and an acknowledgement line, said dispatching and receiving station having a destination selecting device comprising a set of switches adapted to be connected to said set of address lines for communicating the address of a destination station, an address decoder adapted to be connected to said set of address lines for decoding the address of a destination station, said address decoder having means for comparing the decoded address to an assigned address individual to that dispatching and receiving station, connecting means connecting said address decoder to said acknowledgement line for conveying a signal to said line responsive to a comparison between said decoded address and said individual address, and an operation decoder connected to said set of control lines and to said address decoder and responsive to a comparison between said decoded address and said individual address for decoding operation codes present on said set of control lines, to produce control signals in response thereto for controlling a destination transfer operation.

* * * * *